June 30, 1931. W. N. BOOTH 1,812,033
TIRE CARRYING RIM
Filed July 16, 1928 2 Sheets-Sheet 1
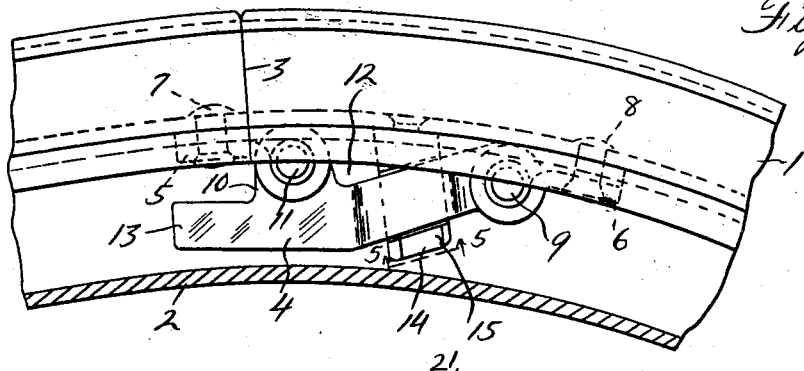
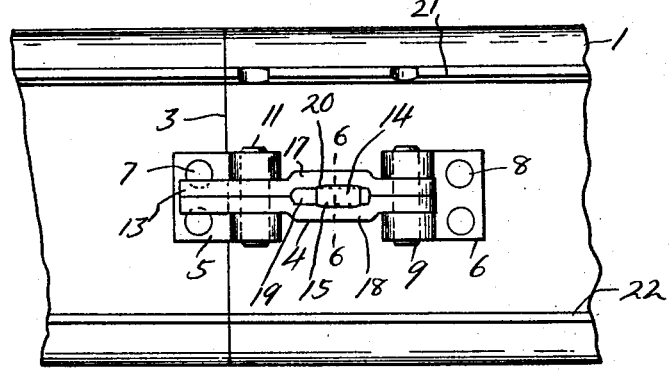
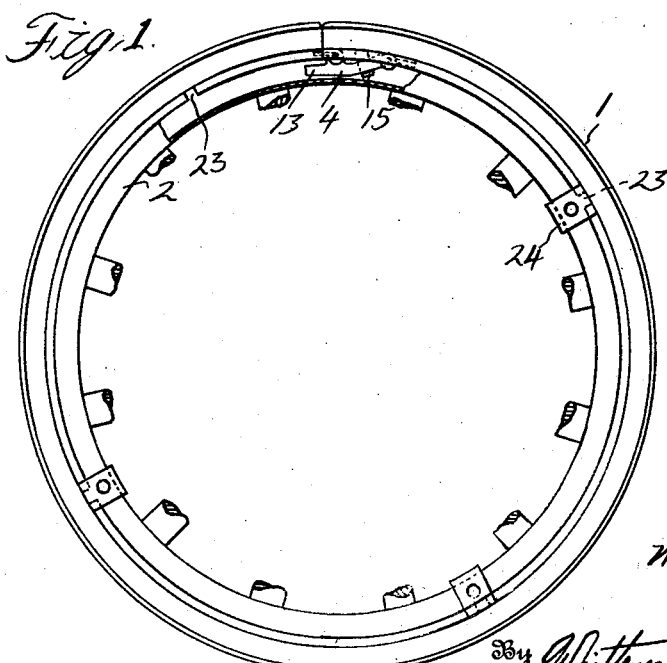
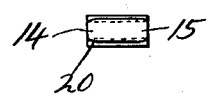
Inventor
William N. Booth June 30, 1931. W. N. BOOTH 1,812,033
TIRE CARRYING RIM
Filed July 16, 1928 2 Sheets-Sheet 2
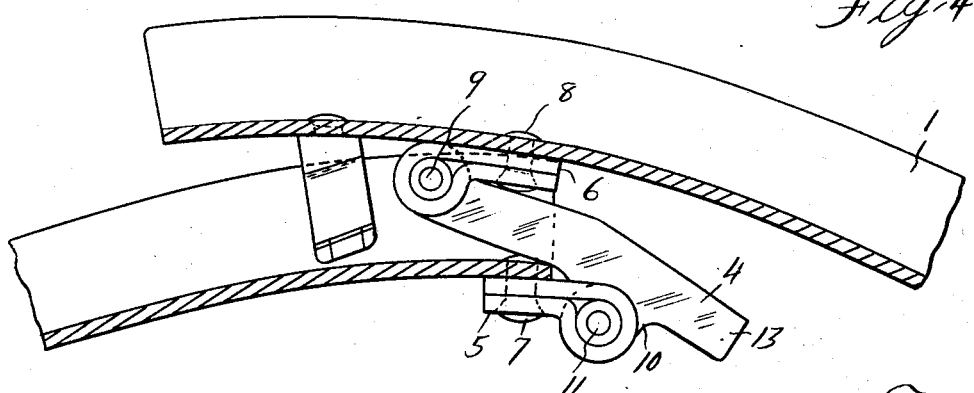
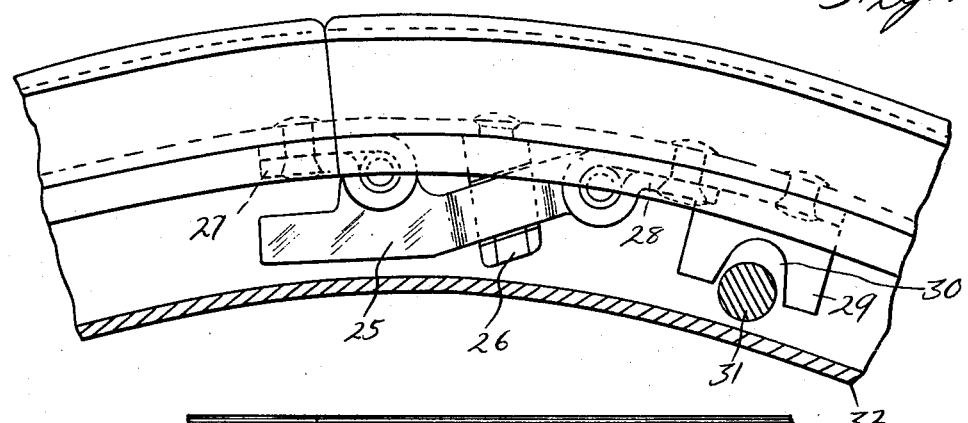
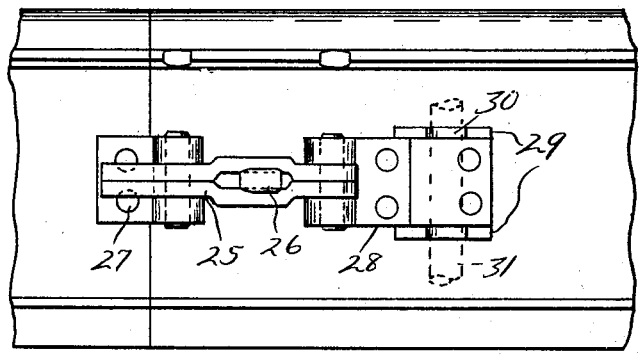
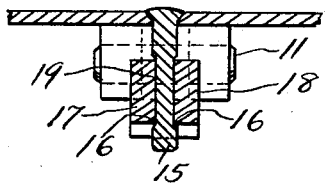
Inventor
William N. Booth Patented June 30, 1931

1,812,033

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

TIRE CARRYING RIM

Application filed July 16, 1928. Serial No. 293,150.

The invention relates to tire carrying rims and refers more particularly to rims of the transversely split type. One of the objects of the invention is to provide an improved construction of link between the rim ends for collapsing or contracting the rim to facilitate mounting or dismounting a tire. Another object is to provide improved means for holding the rim ends in registration. A further object is to so construct a hinge member for securing the link to one rim end that this hinge member constitutes a driver for the rim. With these and other objects in view, the invention resides in the novel features of construction and combinations and arrangements of parts as more fully hereinafter set forth.

In the drawings:—

Figure 1 is a front elevational of a rim embodying my invention and showing partly broken away a felly upon which the rim is mounted;

Figure 2 is a front elevation partly broken away of a portion thereof;

Figure 3 is an inside plan of a portion of the rim;

Figure 4 is a sectional elevation of the rim in collapsed position;

Figure 5 is an end elevation of one of the rim latching members;

Figure 6 is a cross section on the line 6—6 of Figure 3;

Figure 7 is a view similar to Figure 2, showing a modification;

Figure 8 is an inside plan of a portion of the rim shown in Figure 7.

1 is a tire carrying rim which is adapted to be mounted upon the felly 2. This rim is transversely split at 3 so that it may be collapsed or contracted to mount or dismount a tire. To facilitate collapsing of the rim, I have provided the link 4 which is pivotally connected to the rim ends by means of the hinge members or pivotal mountings 5 and 6. The hinge member 5 is rigidly secured to the inner face of the base of one rim end as by means of the rivets 7 adjacent to the split 3 and is adapted to overlap the base of the other rim end. The hinge member 6 is rigidly secured as by means of the rivets 8 to the inner face of the base of the last mentioned rim end at a greater distance from the split 3. The link 4 is pivotally connected at one end to the hinge member 6 by means of the pin 9 and has the outwardly extending ear 10 which is pivotally connected to the hinge member 5 by means of the pin 11, the arrangement being such that the recess 12 is formed at the outer edge of the link between its points of pivotal connection to receive the base of the rim end which is pivotally connected to the ear 10 when the rim is collapsed, thereby providing for more complete collapsing of the rim than would otherwise be possible. The link 4 is provided with the polygonal extension 13 beyond the ear 11 and extending peripherally of the rim and spaced from the base thereof a sufficient distance to permit engagement of the socket thereover of a rim operating tool. The arrangement is such that by applying the tool to the extension 13 and using the tool as a lever the rim can be collapsed from the position shown in Figure 1 to the position shown in Figure 4, it of course being understood that the rim at this time is not mounted upon the felly.

To automatically secure the rim ends in registration, I have provided means upon one of the rim ends for engaging the link to hold the latter in predetermined position. As shown, this means comprises the stud 14 which extends inwardly from and is rigidly secured to the base of the rim end to which the hinge member 6 is secured, this stud being located between the hinge member and the split 3 and in a position to engage the link between the pivots 9 and 11. The stud, as shown, is of rectangular cross section and has at its inner end the enlargement or head 15 providing the tapered shoulders 16 which are adapted to extend parallel to the inner edge of the link 4. The link 4 comprises the flat metallic bars 17 and 18 which are in contact at their ends but are spaced apart at an intermediate point to provide the opening 19 therebetween. The width of this opening is substantially equal to the thickness of the stud 14, but less than the thickness of the head 15 of this stud, the bars being resilient so that they may flex transversely to pass over the head 15. The portion of the head 15 nearest the split 3 is preferably tapered as at 20 to facilitate spreading the bars apart during the initial portion of the collapsing movement of the rim. The arrangement is such that in returning the rim to its operative position from its collapsed position the bars 17 and 18 upon contact with the head 15 of the stud 14 flex sufficiently to pass over this head and snap back to their normal positions as soon as they have passed over the head so that the rim ends are held from radial separation. The stud 14 and the bars 17 and 18 also cooperate to hold the rim ends from lateral separation. It will thus be seen that my construction is such that it automatically operates to hold the rim ends in registration.

The rim shown in Figures 1 to 5, inclusive, is of that type having the annular beads 21 and 22 near the front and rear portions of its base for engaging seats upon the felly 2, which is channel-shaped. The front bead 21 is provided with the peripherally spaced notches 23 for engagement by tongues upon the clamps 24 which secure the rim upon the felly, the driving of the rim with the felly being accomplished by the clamps.

In the modification shown in Figures 6 and 7, the rim is of a different type requiring a driver. In this modification the construction of link 25 stud 26 and hinge member 27 is the same as the construction of link 4, stud 14 and hinge member 5 shown in the first mentioned modification. The hinge member 28, however, is constructed in a different manner than the hinge member 6, it having spaced side flanges 29 which are provided with aligned transverse recesses 30 for engagement by a securing bolt 31 extending transversely through the felly 32. This hinge member is preferably formed by a stamping operation from a sheet metal blank and the side flanges are so located and spaced apart that the link 25 may extend therebetween when the rim is collapsed.

From the above description, it will be seen that I have provided an improved arrangement for facilitating the collapsing of a rim, which is transversely split at one point only. It will also be seen that I have provided means for automatically maintaining the rim ends in registration, both radially and laterally. It will further be seen that I have so constructed the device between the rim ends that it functions to drive the rim with the felly upon which the rim is mounted.

What I claim as my invention is:

1. The combination with a transversely split rim, of a link pivotally connected to the rim ends and comprising resilient bars with an opening therebetween, and a stud extending inwardly from one rim end and adapted to extend through the opening between the bars, said stud having a lateral shoulder adapted to have a snap engagement with said link to secure the same in predetermined position relative to the stud.

2. The combination with a transversely split rim, of a link comprising adjacent resilient bars pivotally connected to the rim ends and provided with an extension adjacent to the split and with spaced portions between the pivots forming an opening, and a stud extending inwardly from one rim end and adapted to engage in the opening between the bars, said stud having a lateral shoulder for snap engagement with one of the bars.

In testimony whereof I affix my signature.

WILLIAM N. BOOTH.